United States Patent [19]
Cruickshank

[11] Patent Number: 5,271,224
[45] Date of Patent: Dec. 21, 1993

[54] VARIABLE EXHAUST SYSTEM FOR AN INTERNAL COMBUSTION ENGINE

[76] Inventor: Ronald W. Cruickshank, 460 Quail Ridge Dr., Westmont, Ill. 60559

[21] Appl. No.: 977,540

[22] Filed: Nov. 17, 1992

[30] Foreign Application Priority Data

Nov. 19, 1991 [AU] Australia .............................. PK9551

[51] Int. Cl.$^5$ ............................................. F02B 27/06
[52] U.S. Cl. ....................................... 60/314; 60/312; 181/241
[58] Field of Search .................. 60/312, 314; 181/197, 181/206, 241, 228, 248, 277

[56] References Cited

U.S. PATENT DOCUMENTS 4,941,319  7/1990  Yamamoto ............................ 60/314

FOREIGN PATENT DOCUMENTS 112823  9/1980  Japan ..................................... 60/314

*Primary Examiner*—Douglas Hart

[57] ABSTRACT

A dynamically variable exhaust system provides for maximum efficiency of an internal combustion engine (30) by including an exhaust control device (35) which is operated by a control mechanism (33) and managed by a control unit (32). The length and cross-sectional area of the exhaust header section (36) can be varied by transversely displacing the effective exhaust passage within control device (35) while maintaining a streamlined profile of the effective passage throughout a predetermined range of displacement. The control unit (32) can be influenced by numerous operational inputs including control device position potentiometer (40), engine speed input (41), engine load input (42), vehicle braking sensor (43), exhaust emission and temperature sensor (44), and engine management system input (45).

20 Claims, 4 Drawing Sheets

VARIABLE EXHAUST SYSTEM FOR AN INTERNAL COMBUSTION ENGINE

FIELD OF THE INVENTION

The present invention relates to exhaust systems for controlling an internal combustion engine.

BACKGROUND OF THE INVENTION

Description of Prior Art

It is well known that the performance of an internal combustion engine can be improved by varying the length of the exhaust system in response to changes in engine speed. Particularly important is the distance from the exhaust port to any divergent section, from which an exhaust pulse is reflected with a negative amplitude, and the distance from the exhaust port to any convergent section from which exhaust pulses are reflected with a positive amplitude.

Previous inventions have disclosed a variety of means for varying the length of exhaust systems and in particular for two-cycle engines where the exhaust system has a profound effect on engine performance. U.S. Pat. Nos. 2,102,559 (Kadenacy 1937) and 3,254,484 (Kopper 1966) disclose exhaust systems of variable length provided by axial extension of the exhaust pipes. This method has been utilized in a number of two-cycle applications but has the major disadvantage of requiring the displacement of the external structure of the exhaust system down stream of the axial extension section. This in turn makes it difficult to accommodate the exhaust system and provide rapid response to changes in engine speed. The Kadenacy patent (2,102,559) discloses a variation which includes the axial extension of an overlapping, co-axial section which, while reducing the displacement of the exhaust system, results in non-streamlined gas flow and poor exhaust pulse dynamics between the co-axial sections.

It is envisaged that the axial extension of the previously mentioned designs could be modified such that the extension remains along the center line of the extendable section but rather than linear follows an arced path. Such a modification would improve the physical operations of the axial extension design but would not overcome the other afore mentioned disadvantages.

A number of patents have disclosed means for varying the distance from an exhaust port to a reflective convergent section of an exhaust system. Examples of such patents include U.S. Pat. Nos. 3,703,937 (Tenney 1972), 3,726,092 (Raczuk 1973) and 4,941,319 (Yamamota 1990). In practice, while some performance improvements are provided this method does not provide optimal performance because it does not vary the important distance between the exhaust port and any section, such as a divergent section, upstream of the convergent section.

U.S. Pat. No. 5,134,850 (Saito 1992) discloses a means for varying the distance between an exhaust port and a point of divergence in the exhaust passage by way of a butterfly valve which controls the communication between merging exhaust passages. This method has the disadvantages of providing only a sudden point of divergence at the open butterfly valve, which does not efficiently utilize the energy of an exhaust pulse, and it does not influence the distance from the exhaust port to any point down stream of the divergence.

OBJECTS AND ADVANTAGES

Accordingly, several objects and advantages of my invention are:

(a) To provide improved engine performance by dynamically varying the behavior and timing of exhaust gas flow and exhaust pulses in response to changes in engine operations.

(b) To provide a dynamically variable exhaust system of which the effective internal passage length and/or cross sectional area can be rapidly changed during engine operation.

(c) To provide a dynamically variable exhaust system which can be readily accommodated by maintaining a substantially fixed external structure.

(d) To provide a dynamically variable exhaust system which maintains a streamlined internal exhaust passage, and maintains a laminar flow within the exhaust passage, throughout a range of variability.

(e) To provide a means for dynamically varying an exhaust system using an exhaust control device which may be positioned at any point in an exhaust system, including in close proximity to an exhaust port or as an integral part of an engine casting.

(f) To provide a method of dynamically varying the travel distance and hence timing of both negative and positive amplitude exhaust pulses by positioning an exhaust control device upstream of both divergent and convergent sections of an exhaust system.

(g) To provide a dynamically variable exhaust system which may be readily adapted to either single or multiple cylinder engine applications.

Further objects and advantages of my invention will become apparent from consideration of the drawings and ensuing description.

SUMMARY OF THE INVENTION

The present invention achieves the afore stated objectives and advantages by dynamically varying the effective length and/or cross sectional area of an exhaust system. The dynamic variation is provided by including an exhaust control device in the exhaust system which can transversely displace the effective exhaust passage center line within the control device. Importantly, the control device promotes a streamlined internal exhaust passage profile and laminar flow throughout the range of variability.

DETAILED DESCRIPTION OF THE PRESENTLY PREFERRED EMBODIMENTS

Application Examples

Figure 1:
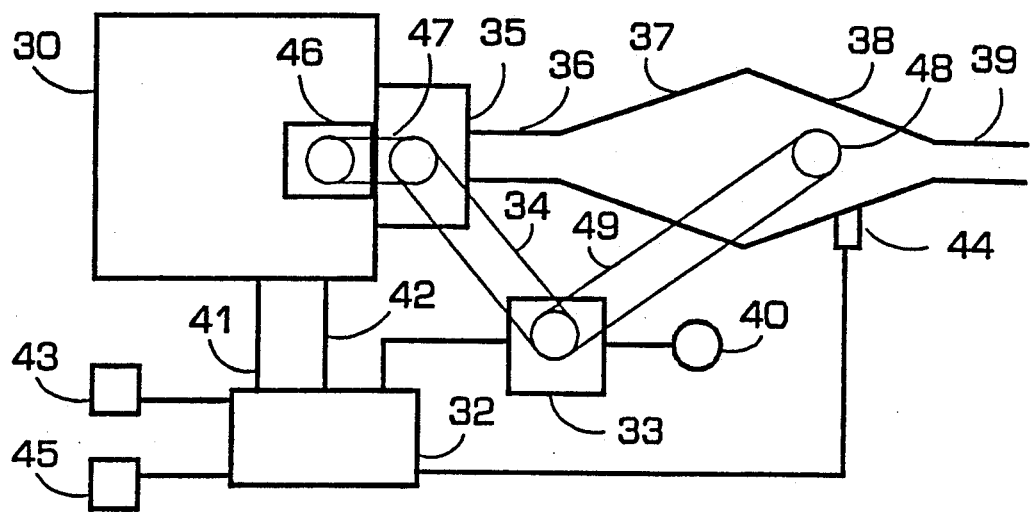
FIG. 1 shows an application of the present invention applied to a two-cycle engine.

FIG. 1 illustrates an exemplary application and positioning of the present invention within the exhaust system of a two-cycle engine 30. In this application an exhaust control device 35 is used to dynamically vary the effective length of the exhaust header section 36 and can be positioned, for example, in either the exhaust header section or as an integral part of the engine casting. The exhaust includes a divergent section 37, a convergent section 38, and a tail pipe 39. The control device 35 is managed by a control unit 32 which controls a control mechanism 33 which operates on the control device 35 via transmission 34. In operation, the control unit 32 can be influenced by numerous inputs including control device position potentiometer 40, engine speed input 41, engine load input 42, vehicle braking sensor 43, exhaust emission and temperature sensor 44, and engine management system input 45.

FIG. 1 also illustrates that the control device 35 can be readily co-ordinated with other engine devices, for example: with an exhaust port valve 46 by way of co-ordinating mechanism 47, and with a reflecting baffle displacement device 48 by way of co-ordinating mechanism 49.

In managing the exhaust control device 35 it is desirable to consider not only peak engine performance but also vehicle controllability and exhaust emissions. In this way the present invention may be combined with other engine management systems so that, for example, correct timing of exhaust pulses may allow for the exhaust port to be open longer and increase power while reducing exhaust emissions.

In some applications it is beneficial for the operations of a control device 35 to be influenced by the temperature input from an exhaust emission and temperature sensor 44 so that at lower temperatures the effective exhaust length is longer than at higher exhaust temperatures. This is due to the fact that the speed of exhaust pulses can vary with exhaust temperature.

In some applications it is beneficial for a control unit 32 to modify the operations of the control device 35 while the brakes of a vehicle are applied, sensed by a vehicle braking sensor 43, so as to reduce unnecessary operation, and wear.

VARIATIONS IN CONTROL UNITS

The control unit 32 can be of any suitable form such as an electrical circuit, a central processing unit (CPU), or a mechanical switch or valve unit which is capable of controlling the exhaust control device 35 based on the numerous possible inputs. The functions of the control unit 32 can be incorporated into a central engine management system which can control other areas of engine operations such as ignition, fuel, and valves.

VARIATIONS IN CONTROL MECHANISMS

The control mechanism 33 can be of any suitable form which provides the force or displacement required by the control device 35 and includes an electrical servo motor, electrical step motor, solenoid, pneumatic diaphragm, centrifugal governor, fluid pressure mechanism, gas pressure mechanism, or other such device. In some applications the operations of a control mechanism 33 and that of a control unit 32 can be combined in a single mechanism, such as a centrifugal governor or pneumatic diaphragm device.

VARIATIONS OF TRANSMISSIONS

In some applications the control mechanism 33 may operate remotely on the control device 35 by way of a transmission 34 such as cables, belt and pulley, linkages, cranks, pressure lines, or other such devices. In other applications the control mechanism 33 can operate directly on the control device 35 and not require the transmission 34.

In other applications, such as on small engines, the implementation of the control device 35 can be simplified by operating it directly from the engine throttle mechanism.

COMBINATIONS OF CONTROL DEVICES AND CONTROL MECHANISMS

FIGS. 2 to 12 illustrate examples of various combinations of exhaust control devices and control mechanisms.

Figure 2:
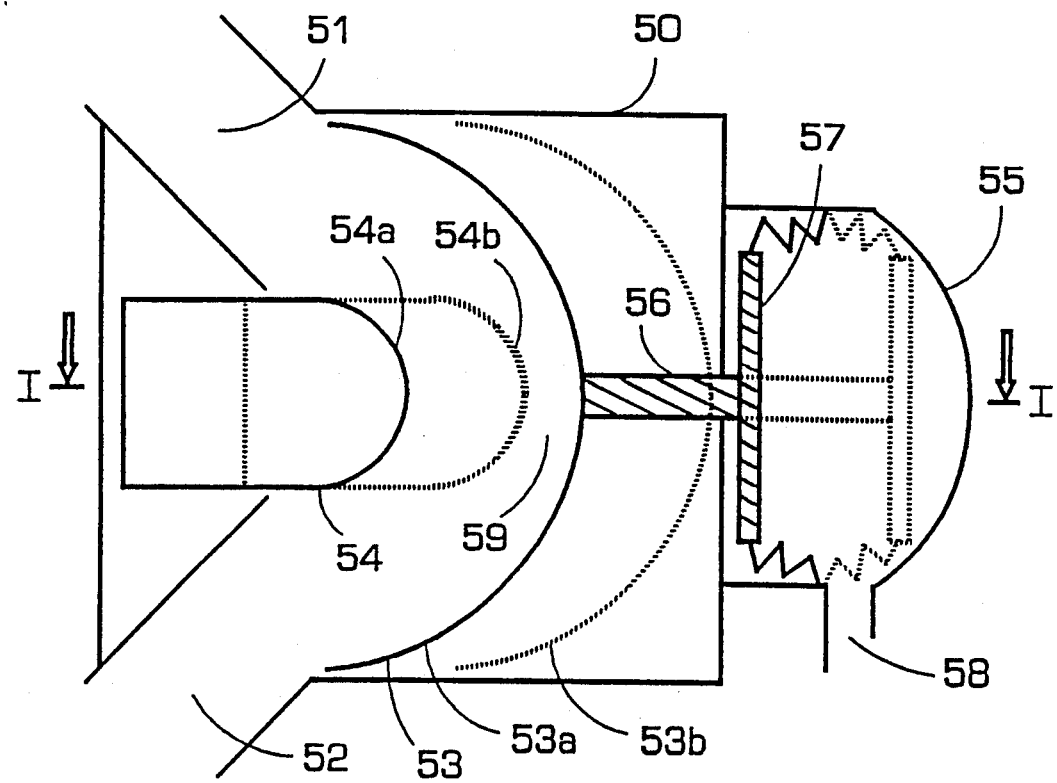
FIG. 2 shows an embodiment of the present invention incorporating a pneumatic diaphragm control mechanism.
Figure 3:
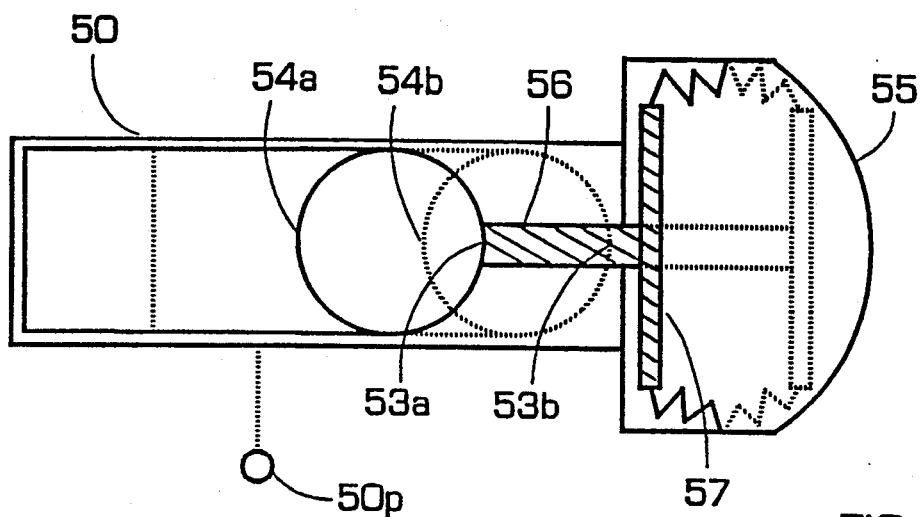
FIG. 3 is a sectional view of FIG. 1 along line I—I.

FIGS. 2 and 3 illustrate an exhaust control device 50. Elements 53 and 54 define a communicating passage 59 between passages 51 and 52 and are displaceable, between positions 53a and 53b, and 54a and 54b respectively, so as to provide transverse displacement of the exhaust center line. Pneumatic diaphragm control mechanism 55 includes transmission shaft 56, diaphragm 57, and pressure feed inlet 58. It is envisaged that control device 50 could be modified such that the displacement of passage 59 is accomplished by the rotation of elements 53 and 54 about an axis of rotation perpendicular to line I—I and passing through pivot point 50p. It is envisaged that elements 53 and 54 can be readily modified so as to be capable of being displaced by a varying degree from one another and hence provide for the variation of both length and cross-sectional area of the exhaust passage.

Figure 4:
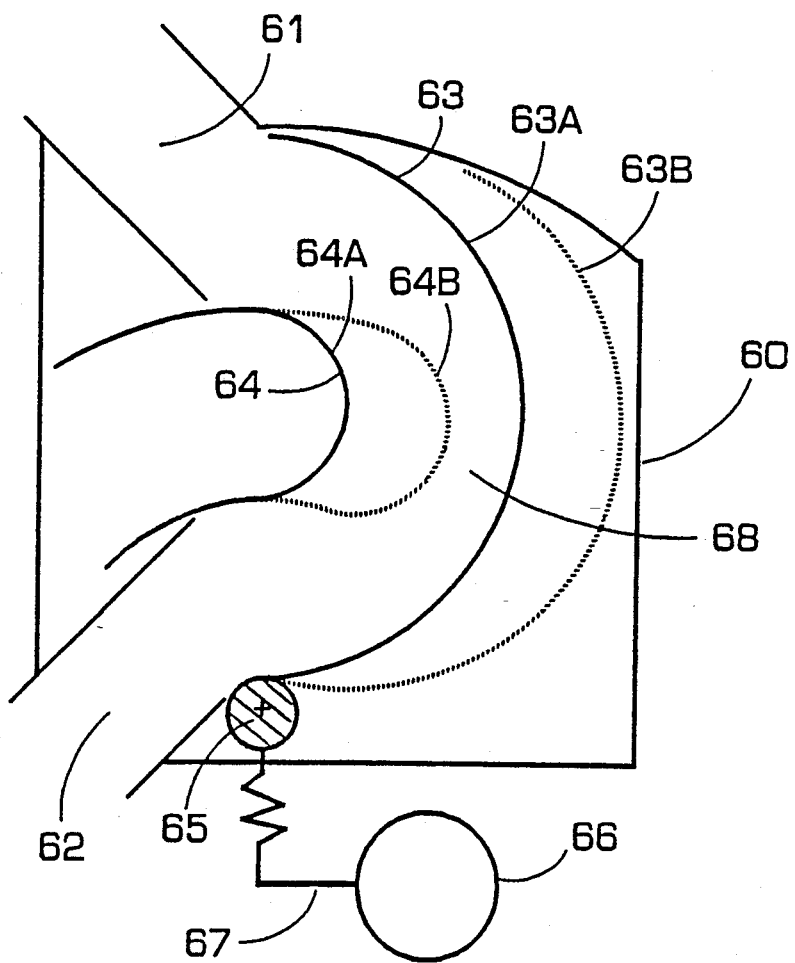
FIG. 4 shows an embodiment of the present invention incorporating an electric servo motor control mechanism.

FIG. 4 illustrates an exhaust control device 60. Elements 63 and 64 define a communicating passage 68 between passages 61 and 62 and are rotatably displaceable about pivot 65, between positions 63a and 63b, and 64a and 64b respectively, so as to provide transverse displacement of the exhaust center line. Electric servo motor control mechanism 66 operates control device 60 via transmission 67.

Figure 5:
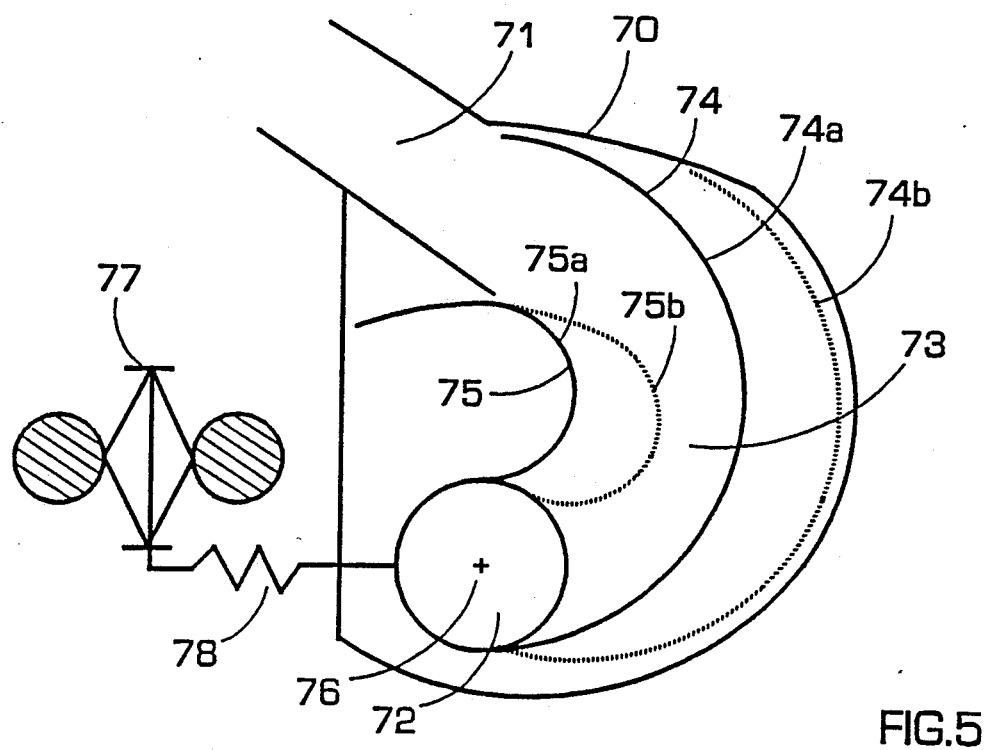
FIG. 5 shows an embodiment of the present invention incorporating a centrifugal governor control mechanism.

FIG. 5 illustrates an exhaust control device 70. Elements 74 and 75 define a communicating passage 73 between passages 71 and 72 and are rotatably displaceable about pivot 76, between positions 74a and 74b, and 75a and 75b respectively, so as to provide transverse displacement of the exhaust center line. As illustrated, passage 71 is perpendicularly opposed to passage 72 by way of curvature of passage 73 in both horizontal and vertical planes. Centrifugal governor control mechanism 77 operates control device 70 via transmission 78.

Figure 6:
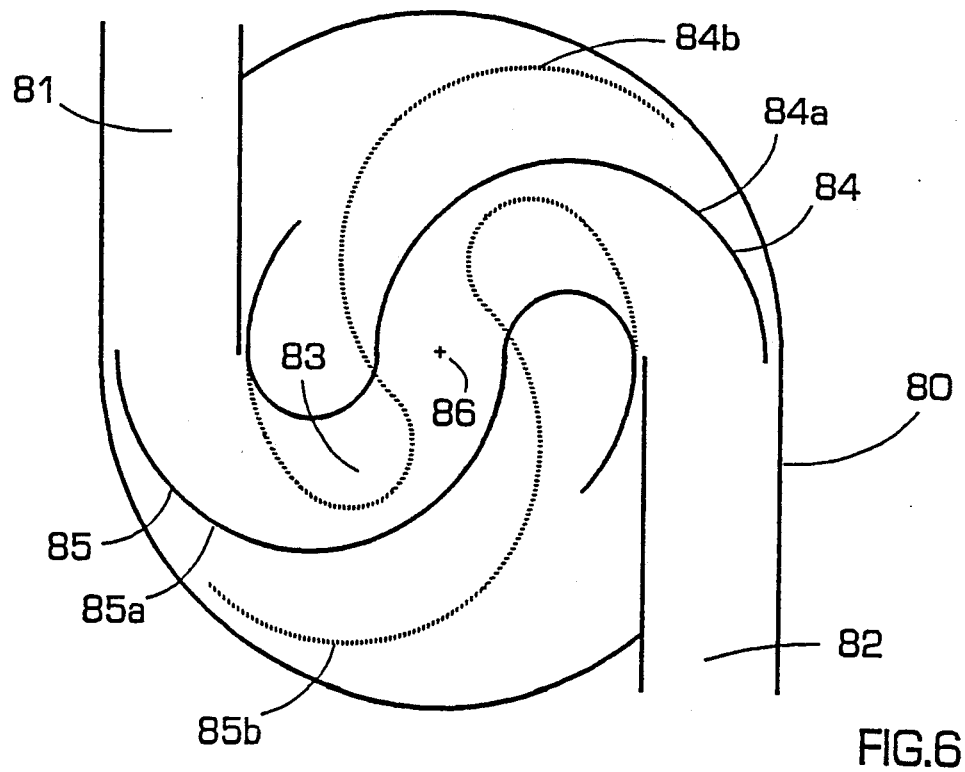
FIG. 6 shows a control device with a rotating center.

FIG. 6 illustrates an exhaust control device 80. Elements 84 and 85 define a communication passage 83 between passages 81 and 82 and are rotatably displaceable about pivot 86, between positions 84a and 84b, and 85a and 85b respectively, so as to provide transverse displacement of the exhaust center line.

Figure 7:
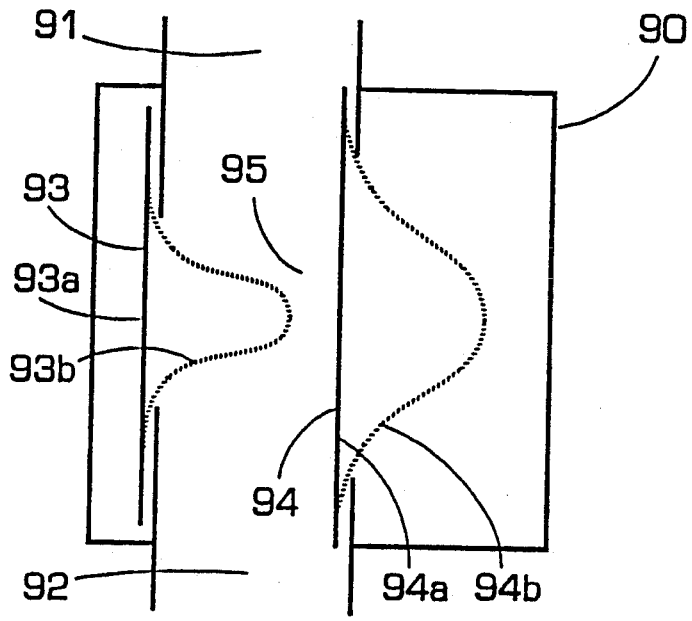
FIG. 7 shows a control device with flexible side elements.

FIG. 7 illustrates an exhaust control device 90. Flexible elements 93 and 94 define a sealed communication passage 95 between passages 91 and 92 and are displaceable, between positions 93a and 93b, and 94a and 94b respectively, so as to provide transverse displacement of the exhaust center line. It is envisaged that control device 90 could be modified so that elements 93 and 94 are displaceable in two directions to form a twin curved (S) shaped passage 95. Examples of the possible construction of flexible elements 93 and 94 include single elements, for example flexible strips of metal, or elements made up of multiple articulated sections.

Figure 8:
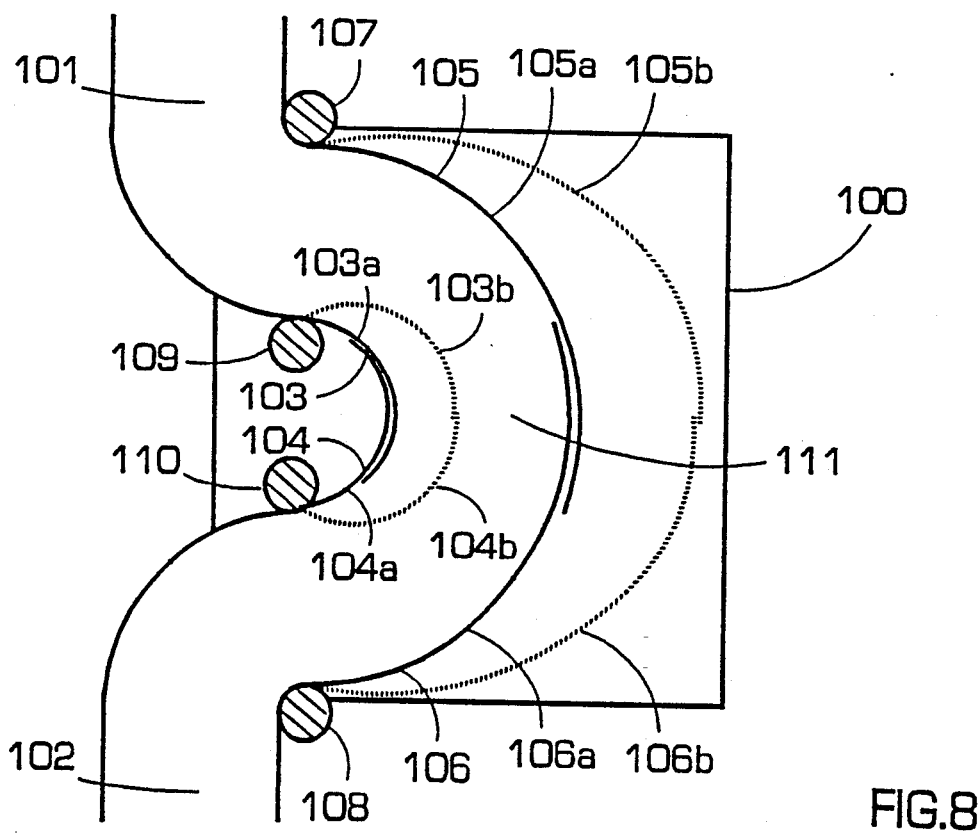
FIG. 8 shows a control device with a multi-element center.

FIG. 8 illustrates an exhaust control device 100. Elements 103, 104, 105, and 106 define a communication passage 111 between passages 101 and 102. They are rotatably displaceable about pivots 107, 108, 109, and 110, between positions 103a and 103b, 104a and 104b, 105a and 105b, and 106a and 106b respectively, so as to provide transverse displacement of the exhaust passage center line.

The displacement of elements 103, 104, 105, and 106 may be readily controlled so as to vary both the transverse displacement and cross-sectional area of passage 111.

VARIATIONS IN LENGTH AND CROSS-SECTIONAL AREA

In any arrangement of the present invention it is envisaged that any displacable sections of the control devices can be readily modified so that the displacement changes their orientation so as to vary both the length and the cross-sectional area of the effective exhaust passage within the control device.

CONTROL DEVICE CONSTRUCTION MATERIALS

A control device can be constructed of any suitable material which can be formed into the required structure and can withstand the exhaust environment such as: cast, pressed, or welded, metal; carbon fiber, composites, high temperature plastics, plastics with a temperature insulating lining or coating.

OFFSET OF EXHAUST PRESSURE ON A CONTROL DEVICE

In any arrangement, exhaust pressure on internal sections of a control device can be offset by the inclusion of an offsetting pressure device such as a spring or pneumatic diaphragm. When a pneumatic diaphragm is used it can be made to communicate with the exhaust system pressure so that the offsetting force of the diaphragm increases as the pressure in the exhaust rises.

MULTI-CYLINDER ENGINE APPLICATION

FIG. 1 illustrates the application of the present invention to a single cylinder engine. It will be appreciated that control devices can be readily combined and controlled in a multicylinder engine application, as either multiple individual devices or as integrated devices.

Multiple control devices can act individually or be linked in series or parallel for example by shafts, cables, or electrically, to act in co-operation.

Although the descriptions above contain many specifications and specific modifications, these should not be construed as limiting the scope of the invention but as merely providing examples of some of the presently preferred embodiments of this invention. For example, in any arrangement where a single passage is referred to, specified, or implied, then the single passage may be replaced with a combination of multiple passages. For example, in FIG. 4, passage 68 could be readily substituted for multiple, substantially parallel, or non-parallel, passages. The term 'passage' can include instances of both single and multiple passages.

Thus the scope of the invention should be determined by the appended claims and their legal equivalents, rather than by the examples given.

I claim:

1. An exhaust system for an internal combustion engine comprising:
    a first fixed exhaust passage communicating with an exhaust port means of said internal combustion engine;
    an exhaust control means including a non-linear exhaust passage means which defines a non-linear effective exhaust passage between said first fixed exhaust passage and a second fixed exhaust passage;
    displacement means for providing transverse displacement of said non-linear effective exhaust passage and for providing substantially continuous variation in the effective length of the non-linear effective exhaust passage throughout the effective range of operations of said exhaust control means;
    displacement control means for controlling said displacement means.

2. The exhaust system according to claim 1 wherein said displacement control means receives inputs selected from the group consisting of control device position, engine speed, engine load, exhaust emission, exhaust temperature, engine management system, and vehicle braking.

3. The exhaust system according to claim 1 wherein said first fixed exhaust passage and said exhaust control means are integrated with the engine of said internal combustion engine.

4. The exhaust system according to claim 1 wherein said displacement means includes a control mechanism selected from the group consisting of electric servo motors, centrifugal governor devices, and pneumatic diaphragm devices.

5. The exhaust system according to claim 1 wherein the operations of said displacement means are influenced by a vehicle brake sensor means.

6. The exhaust system according to claim 1 wherein said displacement means additionally provides means to vary the effective cross-sectional area of said non-linear effective exhaust passage.

7. The exhaust system according to claim 1 wherein the operations of said displacement means is co-ordinated with engine devices of said internal combustion engine selected from the group consisting of exhaust port valve means and exhaust reflecting baffle displacement means.

8. The exhaust system according to claim 1 wherein the operations of said displacement means is influenced by an exhaust temperature sensor means.

9. An exhaust system for an internal combustion engine comprising:
    a first fixed exhaust passage communicating with an exhaust port means of said internal combustion engine;
    an exhaust control means including an exhaust passage means which defines an effective exhaust passage between said first fixed exhaust passage and a second fixed exhaust passage;
    displacement means for swingably displacing said effective exhaust passage about a fixed axis of rotation to provide transverse displacement of said effective exhaust passage and substantially continuous variation in the effective length of said effective exhaust passage throughout the effective range of operations of said exhaust control means;

displacement control means for controlling said displacement means;

and said effective exhaust passage being substantially non-conical.

10. The exhaust system according to claim 9 wherein said displacement control means receives inputs selected from the group consisting of control device position, engine speed, engine load, exhaust emission, exhaust temperature, engine management system, and vehicle braking.

11. The exhaust system according to claim 9 wherein said first fixed exhaust passage and said exhaust control means are integrated with the engine of said internal combustion engine.

12. The exhaust system according to claim 9 wherein said displacement means includes a control mechanism selected from the group consisting of electric servo motors, centrifugal governor devices, and pneumatic diaphragm devices.

13. The exhaust system according to claim 9 wherein the operations of said displacement means are influenced by a vehicle brake sensor means.

14. The exhaust system according to claim 9 wherein said displacement means additionally provides means to vary the cross-sectional area of said effective exhaust passage.

15. The exhaust system according to claim 9 wherein the operations of said displacement means is coordinated with engine devices of said internal combustion engine selected from the group consisting of exhaust port valve means and exhaust reflecting baffle displacement means.

16. The exhaust according to claim 9 wherein the operations of said displacement means is influenced by an exhaust temperature sensor means.

17. An exhaust system for an internal combustion engine comprising:

a first fixed exhaust passage communicating with an exhaust port means of said internal combustion engine;

an exhaust control means including an effective exhaust passage communicating with said first fixed exhaust passage;

displacement means for providing transverse displacement of said effective exhaust passage;

displacement control means for controlling said displacement means;

a second fixed exhaust passage for receiving exhaust from said exhaust control means;

and said effective exhaust passage being defined by flexible element means.

18. The exhaust system according to claim 17 wherein said displacement control means receives inputs selected from the group consisting of control device position, engine speed, engine load, exhaust emission, exhaust temperature, engine management system, and vehicle braking.

19. The exhaust system according to claim 17 wherein said first fixed exhaust passage and said exhaust control means are integrated with the engine of said internal combustion engine.

20. The exhaust system according to claim 17 wherein said displacement means provides means to vary the length and cross-sectional area of said effective exhaust passage.

* * * * *